US012780436B2

(12) United States Patent
De Oliveira et al.

(10) Patent No.: US 12,780,436 B2
(45) Date of Patent: Nov. 3, 2026

(54) AIRCRAFT HAVING A LOCKING DEVICE AND A SYSTEM FOR VISUAL INDICATION OF THE STATE OF SAID LOCKING DEVICE

(71) Applicant: Airbus Operations SAS, Toulouse (FR)

(72) Inventors: Grégory De Oliveira, Toulouse (FR); Thomas Bourdieu, Toulouse (FR); Julien Ferreira, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 396 days.

(21) Appl. No.: 18/402,979

(22) Filed: Jan. 3, 2024

(65) Prior Publication Data

US 2024/0239507 A1 Jul. 18, 2024

(30) Foreign Application Priority Data

Jan. 17, 2023 (FR) ...................................... 2300412

(51) Int. Cl.
*B64D 29/06* (2006.01)
*B64D 45/00* (2006.01)
*E05B 41/00* (2006.01)

(52) U.S. Cl.
CPC ............. *B64D 29/06* (2013.01); *B64D 45/00* (2013.01); *E05B 41/00* (2013.01)

(58) Field of Classification Search
CPC .... B64D 29/06; B64D 45/00; B64D 45/0005; B64D 29/08; B64D 47/02; E05B 41/00; B64C 1/14
See application file for complete search history.

(56) References Cited

U.S. PATENT DOCUMENTS 369,639 A * 9/1887 Goodhue ................ G09F 13/34 40/907
4,613,099 A * 9/1986 Smith .................... B64D 29/06 244/129.4
4,679,750 A * 7/1987 Burhans ................. B64D 29/06 244/129.4
5,518,206 A * 5/1996 Arnold .................... E05B 41/00 244/129.4

(Continued)

FOREIGN PATENT DOCUMENTS

CN 108166849 B 8/2019

OTHER PUBLICATIONS

French Search Report for corresponding French Patent Application No. 2300412 dated Sep. 6, 2023; priority document.

*Primary Examiner* — Brandi N Hopkins
*Assistant Examiner* — Tania Courson
(74) *Attorney, Agent, or Firm* — Greer, Burns & Crain, Ltd.

(57) ABSTRACT

An aircraft with a visual indication system for indicating the locked or unlocked state of a locking device. The system comprises has an opening passing through a wall, a transparent wall closing off the opening and allowing an inner zone of the aircraft to be seen from an outer zone, an indicator to move between first and second positions depending respectively on the locked or unlocked state. The indicator is positioned in the inner zone of the aircraft and has a zone visible through the transparent wall from the outer zone of the aircraft when the indicator is in the first position, the zone not being visible when the indicator is in the second position.

11 Claims, 3 Drawing Sheets

(56) References Cited

U.S. PATENT DOCUMENTS

| | | | | |
|---|---|---|---|---|
| 6,824,175 | B2 * | 11/2004 | Porte | E05B 41/00 244/129.4 |
| 7,571,694 | B2 * | 8/2009 | Boerner | G08B 5/36 116/307 |
| 7,843,363 | B2 * | 11/2010 | Grichener | E05C 19/145 340/439 |
| 9,299,270 | B2 * | 3/2016 | Hosilyk | G09F 19/04 |
| 9,701,413 | B2 * | 7/2017 | Provost | E05B 63/143 |
| 9,856,034 | B2 * | 1/2018 | Marche | E05B 41/00 |
| 10,267,060 | B2 * | 4/2019 | Frommer | B64D 29/06 |
| 2004/0012212 | A1 | 1/2004 | Pratt et al. | |
| 2004/0104583 | A1 * | 6/2004 | Porte | E05B 41/00 292/229 |
| 2013/0257065 | A1 | 10/2013 | Burd | |
| 2015/0191257 | A1 | 7/2015 | Marche | |
| 2017/0240287 | A1 | 8/2017 | Oonishi et al. | |
| 2019/0127075 | A1 | 5/2019 | Fleming et al. | |
| 2019/0368226 | A1 | 12/2019 | Sweeney et al. | |

* cited by examiner

Fig. 6
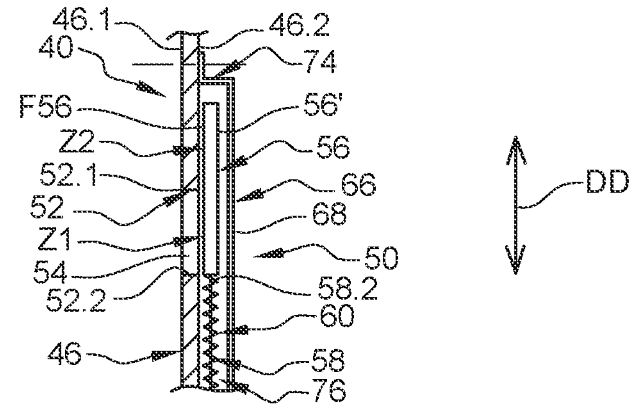
Fig. 7
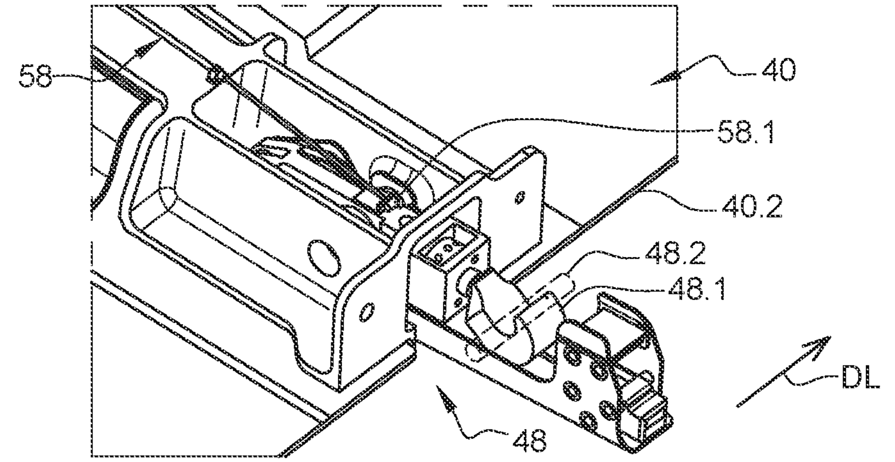
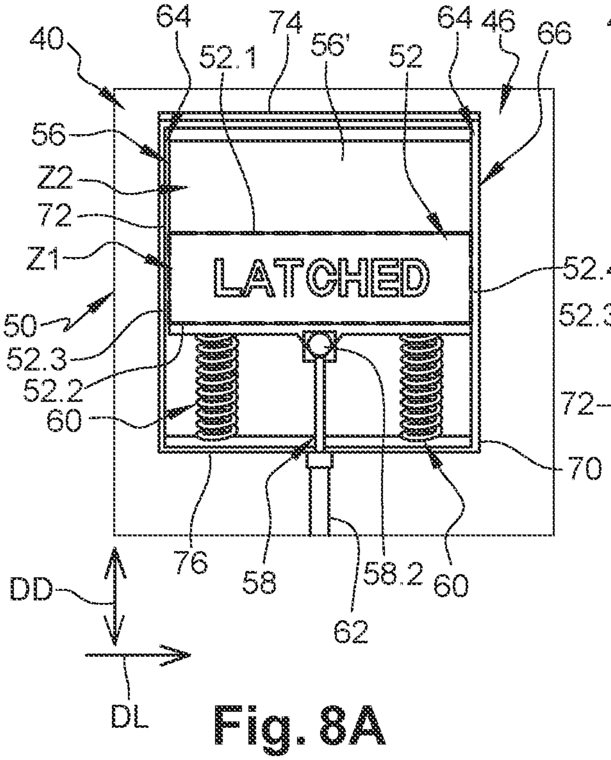
Fig. 8A
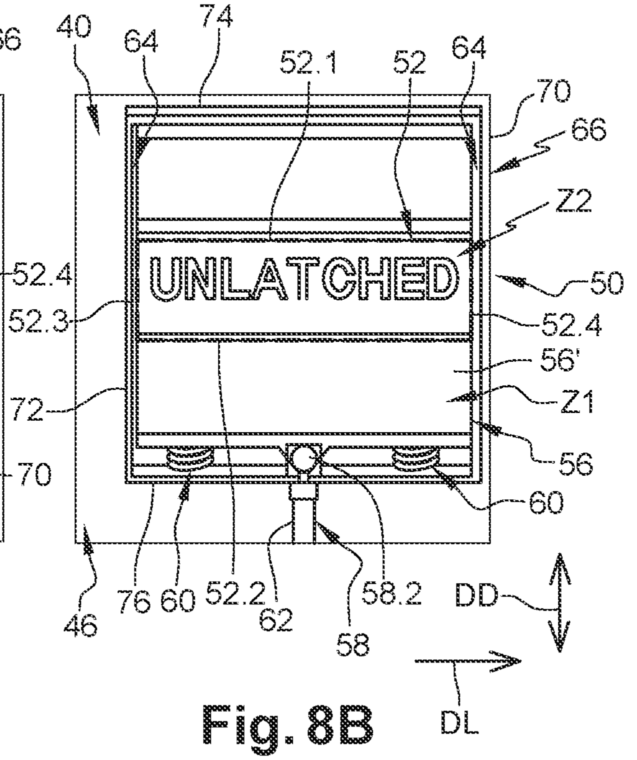
Fig. 8B

AIRCRAFT HAVING A LOCKING DEVICE AND A SYSTEM FOR VISUAL INDICATION OF THE STATE OF SAID LOCKING DEVICE

CROSS-REFERENCES TO RELATED APPLICATIONS

This application claims the benefit of French Patent Application Number 2300412 filed on Jan. 17, 2023, the entire disclosure of which is incorporated herein by way of reference.

FIELD OF THE INVENTION

The present application relates to an aircraft having a locking device and a system for visual indication of the state of said locking device.

BACKGROUND OF THE INVENTION

As illustrated in FIG. 1, an aircraft 10 comprises a fuselage 12 that extends between a nose 12.1 and a tail 12.2, wings 14 that extend on either side of the fuselage 12, and propulsion assemblies 16 positioned beneath the wings and connected to the latter by pylons 18.

For the remainder of the description, a longitudinal direction DL is a direction that extends from the nose 12.1 to the tail 12.2, parallel to the ground when the aircraft is on the ground.

Each propulsion assembly 16 comprises a nacelle 20 and a motor 22, positioned in the nacelle 20, which has an axis of rotation A22 substantially parallel to the longitudinal direction DL.

As illustrated in FIGS. 2 and 3, to allow maintenance to be performed on the motors 22, each nacelle 20 comprises two cowls 24, 24', which are symmetrical with respect to a median vertical plane (passing through the motor axis A22), having upper edges 24.1 connected to the rest of the nacelle 20 by articulations A24 positioned on either side of the pylon 18. Each of the cowls 24, 24' is able to move between a closed state (FIG. 3) in which the cowl 24, 24' is disposed in the continuation of the outer surface of the nacelle 20 and a second, open state (FIG. 2) in which the cowl 24, 24' allows access to the inside of the nacelle 20.

In the closed state, the cowls 24, 24' have contiguous lower edges 24.2 and are kept in this closed state by locking devices 26 distributed along their lower edges 24.2.

According to one embodiment, each locking device 26 comprises an articulated hook provided at the lower edge 24.2 of a first cowl 24, and an anchoring point provided at the lower edge 24.2 of a second cowl 24', the locking device 26 being configured to occupy a locked state in which the hook and the anchoring point cooperate with each other and keep the cowls 24, 24' in the closed and locked state, and an unlocked state in which the hook and the anchoring point do not cooperate and allow the cowls 24, 24' to switch to the open state. According to this embodiment, the hook moves in translation between first and second positions when the locking device 26 passes from the unlocked state to the locked state.

Before each takeoff, a ground operator checks that the cowls 24 and 24' are indeed in the closed and correctly locked state.

Now, due to their stiffness and mass and the position of their articulations A24, the cowls 24, 24' have a tendency to automatically position themselves in the closed state so that it is difficult for the ground operator to determine whether the cowls 24, 24' are indeed in the closed and locked state, especially since the locking devices 26 are positioned at 6 o'clock, in the lower part of the nacelle 20.

In order to ensure that the unlocked state of the cowls is detected, the nacelle 20 comprises a visual indication system 28 for each locking device 26 of the cowls.

According to one embodiment, the visual indication system 28 comprises an indication element 30 that is rigid and able to move between a first, retracted position in which the indication element 30 is not visible and a second, moved-out position in which the indication element 30 is visible. In addition, the outer wall S24 comprises a slot 34 to allow the indication element 30 to pass from the retracted position to the moved-out position.

This solution is not entirely satisfactory since the slot 34 provided at the outer wall S24 of the cowl 24, 24' to allow the passage of the indication element 30 generates aerodynamic disturbances and necessitates reinforcement of the wall around the slot 34, and this results in an increase in the mass of the cowl 24, 24'.

The present invention aims to remedy all or some of the drawbacks of the prior art.

SUMMARY OF THE INVENTION

To this end, the invention relates to an aircraft comprising at least one cowl that is able to move between an open state and a closed state, at least one locking device configured to occupy a locked state in which the locking device keeps the cowl in the closed state and an unlocked state in which the locking device allows the cowl to pass from the closed state to the open state and vice versa, and at least one visual indication system having at least one indicator connected to the locking device and able to move between first and second positions depending respectively on the locked and unlocked states of the locking device, the aircraft comprising at least one wall separating inner and outer zones of the aircraft.

According to the invention, the visual indication system comprises at least one opening passing through the wall, and a transparent wall closing off the opening and allowing the inner zone of the aircraft to be seen from the outer zone. In addition, the indicator is positioned in the inner zone of the aircraft in the first and second positions and has at least one zone visible through the transparent wall from the outer zone of the aircraft when the indicator is in the first position, the zone not being visible through the transparent wall from the outer zone of the aircraft when the indicator is in the second position.

Whatever its position, the indicator of the visual indication system is always positioned in the inner zone of the aircraft. Consequently, this solution makes it possible to reduce the mass of the aircraft and the aerodynamic disturbances. This visual indication system makes it possible to obtain visual detection that is effective, simpler, less expensive and more ergonomic.

According to another feature, the indicator comprises distinct first and second zones, the first zone being positioned facing the opening so as to be visible through the transparent wall from the outer zone of the aircraft in the first position of the indicator, the second zone being positioned facing the opening so as to be visible to through the transparent wall from the outer zone of the aircraft in the second position of the indicator, the first and second zones being different so that it is possible to differentiate them visually.

According to another feature, the first zone is of a first color and/or has at least one first mark. In addition, the second zone is of a second color different from the first color and/or has at least one second mark different from the first mark.

According to another feature, the indicator comprises a plate, parallel to the wall, which has a first face oriented towards the wall, the first and second zones being positioned on the first face.

According to another feature, the opening is rectangular. In addition, each of the first and second zones is rectangular and has substantially the same contour as the opening.

According to another feature, the first and second zones are juxtaposed.

According to another feature, the visual indication system comprises a sliding connection connecting the plate and the cowl, the plate moving in translation in a direction of movement between the first and second positions.

According to another feature, the visual indication system comprises a housing, connected to the wall of the cowl, configured to allow the plate to slide against the wall in the direction of movement.

According to another feature, the housing comprises a bottom parallel to the wall and spaced apart from the latter so as to allow the plate to slide between the wall and the bottom of the housing, and at least two lateral walls, parallel to the direction of movement, connecting the bottom and the wall and configured to form the sliding connection.

According to another feature, the opening has first and second transverse edges perpendicular to the direction of movement. In addition, the housing also comprises first and second end walls, substantially perpendicular to the direction of movement, connecting the bottom and the wall, the end walls being separated by a distance substantially equal to or very slightly greater than three times the distance separating the first and second transverse edges of the opening.

According to another feature, the visual indication system comprises at least one spring, interposed between one of the end walls and the plate, configured to push the plate into the first position. In addition, the visual indication system comprises a cable, connecting the plate and the locking device, configured to pull the plate into the second position counter to the spring(s).

BRIEF DESCRIPTION OF THE DRAWINGS

Further features and advantages will become apparent from the following description of the invention, which description is given solely by way of example, with reference to the appended drawings in which:

FIG. 6 is a perspective view of a part of a cowl equipped with a system for a visual indication of the state, illustrating one embodiment of the invention, FIG. 7 is a perspective view of a part of a locking device, illustrating one embodiment of the invention, FIG. 8A is a depiction of a system for visual indication of the state, illustrating one embodiment of the invention, the visual indication system being in a first position, and, FIG. 8B is a depiction of a system for visual indication of the state, illustrating one embodiment of the invention, the visual indication system being in a second position.

DETAILED DESCRIPTION OF THE PREFERRED EMBODIMENTS

Figure 1:
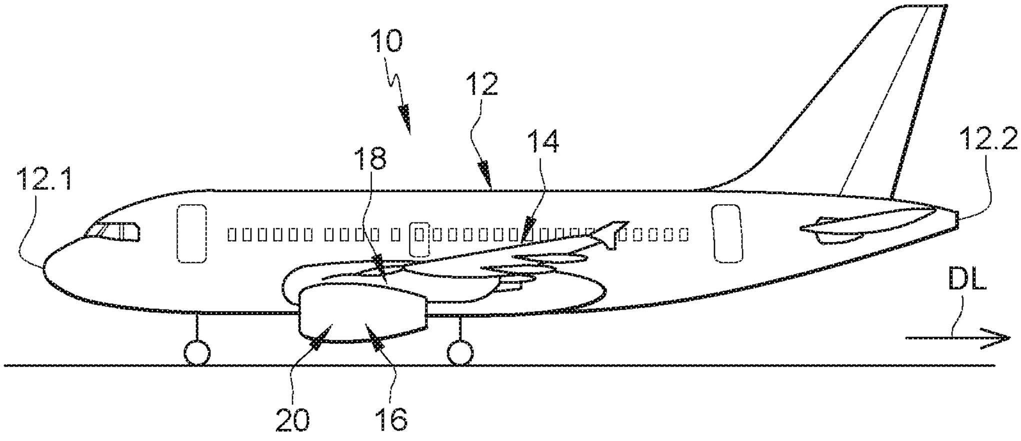
Fig. 1 (Prior Art)
FIG. 1 is a side view of an aircraft according to the Prior Art.
Figure 2:
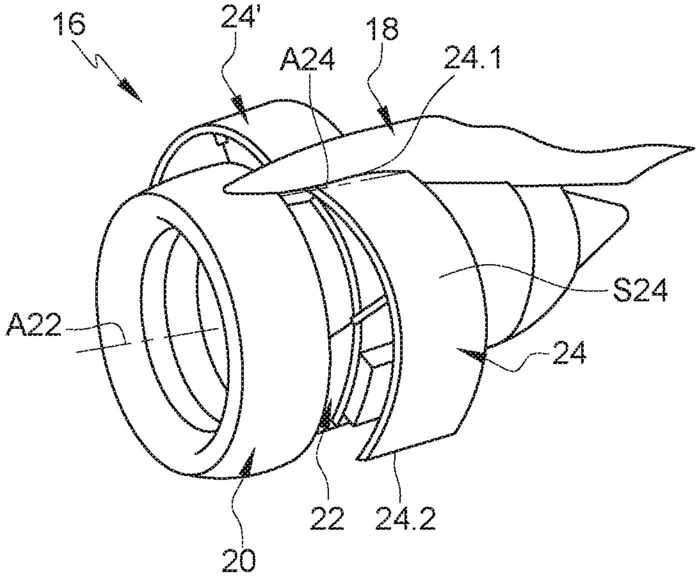
Fig. 2 (Prior Art)
FIG. 2 is a perspective view of a propulsion assembly equipped with cowls in the open state according to the Prior Art.
Figure 3:
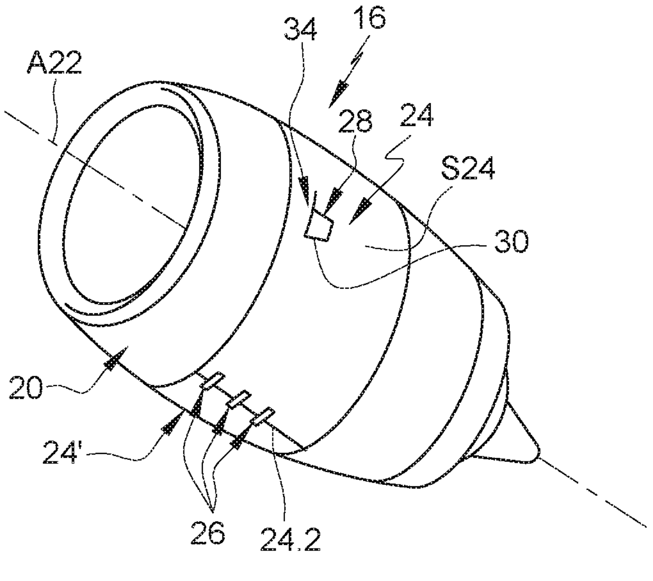
Fig. 3 (Prior Art)
FIG. 3 is a perspective view of the propulsion assembly visible in FIG. 2 according to the Prior Art, the cowls being in the closed state.
Figure 4:
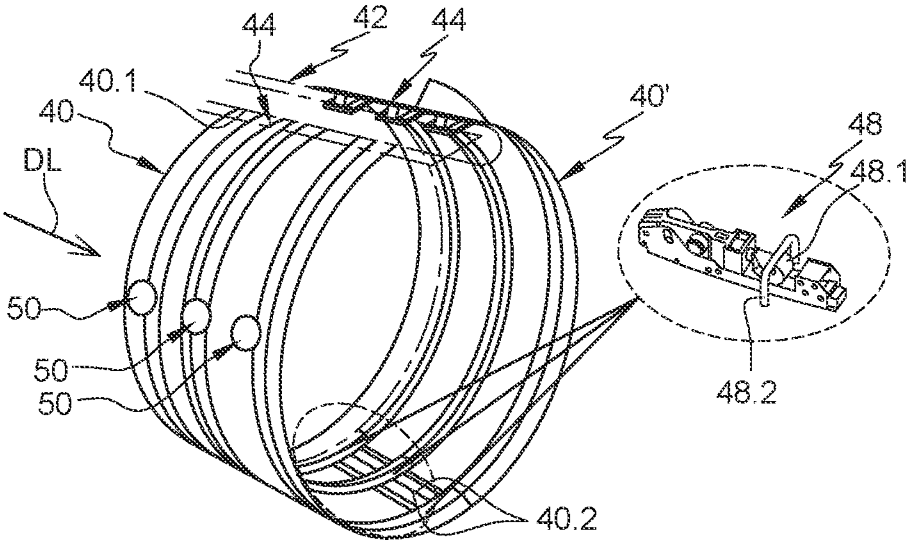
FIG. 4 is a perspective view of the cowls of an aircraft nacelle, one of the cowls having systems for visual indication of the state of the locking devices, illustrating one embodiment of the invention.
Figure 5:
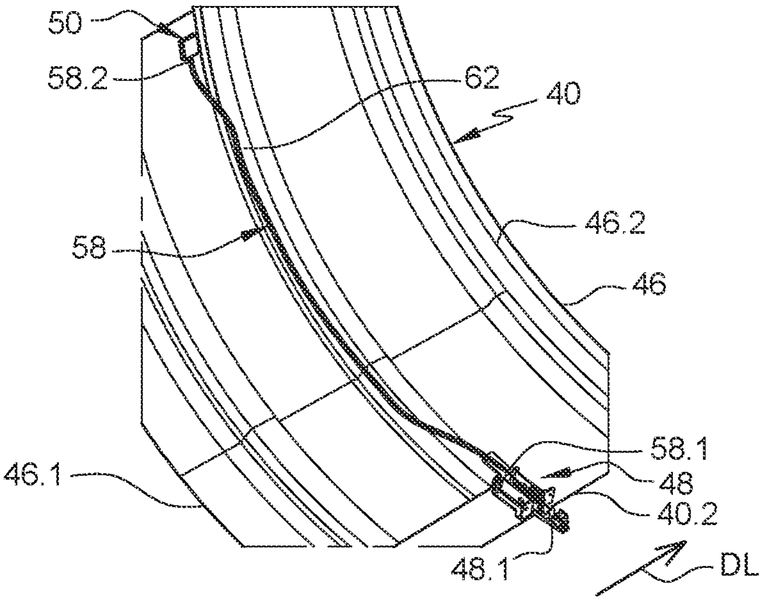
FIG. 5 is a perspective view of a cowl having a locking device and a system for visual indication of the state of the locking device, illustrating one embodiment of the invention.

As illustrated in FIGS. 4 and 5, an aircraft comprises at least one cowl 40 that is able to move relative to a support 42 between open and closed states. For the present application, cowl 40 is understood to mean any element that is able to move between an open state in which it at least partially frees up an opening and a closed state in which it closes off the opening. According to one application, an aircraft nacelle comprises two cowls 40, 40' that are substantially symmetrical with respect to a vertical median plane of the nacelle. Each of them has an upper edge 40.1 connected to the rest of the nacelle by an articulation 44, and a lower edge 40.2, the lower edges 40.2 of the two cowls being contiguous at the vertical median plane when the cowls 40, 40' are in the closed state. Of course, the invention is not limited to this application. Thus, the cowl 40, 40' can be positioned at the fuselage of the aircraft.

The aircraft comprises at least one wall 46 separating an inner zone and an outer zone and having an outer surface 46.1, oriented towards the outer zone, which is visible from the outer zone of the aircraft and an inner surface 46.2 opposite the outer surface 46.1 and oriented towards the inner zone.

The aircraft also comprises at least one locking device 48 configured to occupy an unlocked state in which the cowl 40 is free to pass from the closed state to the open state and vice versa, and a locked state in which the locking device 48 keeps the cowl 40 in the closed state. In the presence of two cowls, the aircraft nacelle comprises three locking devices distributed at the lower edges 40.2 of the cowls 40, 40'.

According to one embodiment, each locking device 48 comprises a hook 48.1 as one with a first element from among the first cowl 40, a support 42 and a second cowl 40', and an anchoring point 48.2 (visible in FIGS. 4 and 7) as one with a second element from among the first cowl 40, a support 42 and a second cowl 40', the first and second elements being different, one of them being the first cowl 40; the hook 48.1 and the anchoring point 48.2 cooperating with each other in the locked state and not cooperating in the unlocked state. The hook 48.1 is able to move between a first position when the locking device 48 is in the locked state and a second position when the locking device 48 is in the unlocked state.

In the case of an aircraft nacelle, the hook 48.1 is as one with the first cowl 40 and the anchoring point 48.2 is as one with the second cowl 40'. The hook 48.1 and the anchoring point 48.2 are positioned on the inner surface 46.2 of the walls 46 of the first and second elements or cowls 40, 40'.

The locking devices 48 are not described further since they may be identical to those of the prior art.

Whatever the configuration, the aircraft comprises at least one cowl 40 that is able to move between an open state and a closed state and at least one locking device 48 configured to occupy a locked state in which it keeps the cowl 40 in the closed state and an unlocked state in which it allows the cowl 40 to pass from the closed state to the open state and vice versa.

The aircraft comprises at least one visual indication system 50 connected to at least one locking device 48. According to one configuration, the aircraft comprises one visual indication system 50 for each locking device 48.

The visual indication system 50 is as one with the first element supporting the hook 48.1, namely the first cowl 40 in FIGS. 4 and 5.

The visual indication system 50 comprises at least one opening 52 passing through the wall 46, and a transparent wall 54 closing off the opening 52 and having an outer surface positioned in the continuation of the outer surface 46.1 of the wall 46. The transparent wall 54 has a thickness substantially identical to that of the wall 46 of the cowl 40. The transparent wall 54 makes it possible to see the inner zone of the aircraft from the outer zone without generating aerodynamic disturbances.

The visual indication system 50 comprises at least one indicator 56, positioned in the inner zone of the aircraft in the first and second positions, having at least one zone Z1 and being able to move between a first position in which the zone Z1 is positioned facing the opening 52 so as to be visible through the transparent wall 54 from the outer zone of the aircraft, and a second position in which the zone Z1 is not positioned facing the opening 52 and is not visible through the transparent wall 54 from the outer zone of the aircraft. Thus, whatever the state of the locking device, the indicator 56 is always positioned in the inner zone of the aircraft. Consequently, it is not necessary to provide a slot passing through wall 46.

According to one embodiment, the indicator 56 comprises distinct first and second zones Z1, Z2, the indicator 56 being able to move between a first position, visible in FIG. 8A, in which the first zone Z1 is positioned facing the opening 52 so as to be visible through the transparent wall 54 from the outer zone of the aircraft, and a second position, visible in FIG. 8B, in which the second zone Z2 is positioned facing the opening 52 so as to be visible through the transparent wall 54 from the outer zone of the aircraft.

Whatever the embodiment, the indicator 56 is connected to a locking device 48 and occupies the first and second positions depending respectively on the locked and unlocked states of the locking device 48. According to one configuration, the indicator 56 occupies the first position when the locking device 48 is in the locked state and the second position when the locking device 48 is in the unlocked state.

According to one configuration, the opening 52 is rectangular. Each of the first and second zones Z1, Z2 is also rectangular and has substantially the same contour as the opening 52.

According to one embodiment, the indicator 56 comprises a plate 56', parallel to the wall 46, which has a first face F56 oriented towards the inner face 46.2 of the wall 46 of the cowl. According to this embodiment, the first and second zones Z1, Z2 are positioned on the first face F56, which has a square or rectangular contour. The first face F56 is divided into two equal zones corresponding to the first and second zones Z1, Z2, which have the same surface area. According to one configuration, the first and second zones Z1, Z2 are juxtaposed and have a common long side. According to another configuration, the first and second zones Z1, Z2 are separated by an intermediate zone.

In order to coordinate the position of the indicator 56 with the state of the locking device 48, the visual indication system 50 comprises a cable 58 connecting the hook 48.1 of the locking device 48 and the indicator 56, and at least one spring 60 that tends to push the indicator 56 into the first position. According to one embodiment, the visual indication system 50 comprises a sheath 62 in which slides the cable 58 that has first and second ends 58.1, 58.2, which are outside the sheath 62, connected respectively to the hook 48.1 and to the indicator 56. The cable 58 and the sheath 62 run along the inner face 46.2 of the wall 46, as illustrated in FIG. 5.

Thus, when the locking device 48 is in the locked state, the hook 48.1 is in the first position. The indicator 56 (or the plate 56'), which is pushed by the spring(s) 60, is also in the first position and the first zone Z1 is positioned facing the opening 52. When the locking device 48 is in the unlocked state, the hook 48.1 is in the second position. The indicator 56 (or the plate 56'), which is pulled by the cable 58 counter to the spring(s) 60, is also in the second position and the second zone Z2 is positioned facing the opening 52. The first and second zones Z1, Z2 are different so that it is possible to differentiate them visually. According to one configuration, the first zone Z1 is of a first color, such as green for example, and/or has at least one first mark such as "locked" or "LATCHED" for example. In addition, the second zone Z2 is of a second color different from the first color, such as red for example, and/or has at least one second mark different from the first mark such as "unlocked" or "UNLATCHED" for example. Of course, other solutions for visually differentiating the first and second zones Z1, Z2 are conceivable.

According to one arrangement, the visual indication system 50 comprises a sliding connection 64 connecting the plate 56' and the cowl 40, more particularly the wall 46 of the cowl 40. According to this arrangement, the plate 56' moves in translation in a direction of movement DD, parallel to the inner surface 46.2 of the wall 46, between the first and second positions. According to one arrangement, this direction DD is substantially perpendicular to the longitudinal direction DL. The plate 56' moves in translation by a given distance between the first and second positions. The opening 52 has first and second transverse edges 52.1, 52.2 perpendicular to the direction DD and first and second lateral edges 52.3, 52.4 parallel to the direction DD.

According to one embodiment, in the presence of a plate 56' sliding against the inner surface 46.2 of the wall 46 of the cowl 40, the visual indication system 50 comprises a housing 66, connected to the inner surface 46.2 of the wall 46 of the cowl 40, configured to allow the plate 56' to slide against the wall 46 in the direction of movement DD. This housing 66 comprises a bottom 68 parallel to the wall 46 and spaced apart from the latter so as to allow the plate 56' to slide between the wall 46 and the bottom 68 of the housing 66, and at least two lateral walls 70, 72 parallel to the direction of movement DD and connecting the bottom 68 and the wall 46 and configured to form the sliding connection 64. These two lateral walls 70, 72 comprise rims allowing them to be connected to the wall 46 of the cowl 40.

According to one configuration, the housing 66 is dimensioned so that the bottom 68 is separated from the wall 46 of the cowl 40 by a distance equal to or slightly greater than the thickness of the plate 56'. In addition, the lateral walls 70, 72 are separated by a distance equal to or slightly greater than the width of the plate 56'.

According to one embodiment, the housing 66 also comprises first and second end walls 74, 76, substantially perpendicular to the direction of movement DD, connecting the bottom 68 and the wall 46. These two end walls 74, 76 comprise rims 74, 76 allowing them to be connected to the wall 46 of the cowl 40. The end walls 74, 76 are separated by a distance substantially equal to or very slightly greater than three times the distance separating the first and second transverse edges 52.1, 52.2 of the opening 52. According to one configuration, the bottom 68, the lateral walls 70, 72 and the end walls 74, 76 are connected to each other so as to delimit, with the wall 46, a cavity in which the plate 56' can move in translation between the first and second positions.

According to one arrangement, the visual indication system 50 comprises at least one spring 60, in particular two springs 60, interposed between one of the end walls 74, 76 and the plate 56'.

Of course, the invention is not limited to the embodiments described above. Whatever the embodiment, the visual indication system 50 makes it possible to obtain visual detection that is simpler, effective, less expensive and more ergonomic.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

at least one cowl configured to move between an open state and a closed state, at least one locking device configured to occupy a locked state in which the locking device keeps the cowl in the closed state and an unlocked state in which the locking device allows the cowl to pass from the closed state to the open state and from the open state to the closed state, at least one visual indication system having at least one indicator connected to the locking device and configured to move between first and second positions depending respectively on the locked state and the unlocked state of the locking device, and, at least one wall separating inner and outer zones of the aircraft, wherein the at least one visual indication system comprises at least one opening passing through the at least one wall and a transparent wall closing off the opening and allowing the inner zone of the aircraft to be seen from the outer zone, wherein the indicator is positioned in the inner zone of the aircraft in the first and second positions and has at least one zone visible through the transparent wall from the outer zone of the aircraft when the indicator is in the first position, the at least one zone not being visible through the transparent wall from the outer zone of the aircraft when the indicator is in the second position.

2. The aircraft according to claim 1, wherein the indicator comprises distinct first and second zones, the first zone being positioned facing the at least one opening so as to be visible through the transparent wall from the outer zone of the aircraft in the first position of the indicator, the second zone being positioned facing the at least one opening so as to be visible to through the transparent wall from the outer zone of the aircraft in the second position of the indicator, the first and second zones being different so that it is possible to differentiate them visually.

3. The aircraft according to claim 2, wherein the first zone is of a first color, or has at least one first mark, or both, and the second zone is of a second color different from the first color, or has at least one second mark different from the at least one first mark, or both.

4. The aircraft according to claim 2, wherein the indicator comprises a plate, parallel to the at least one wall, which has a first face oriented towards the at least one wall, the first and second zones being positioned on the first face.

5. The aircraft according to claim 4, wherein the at least one opening is rectangular and in that each of the first and second zones is rectangular and has the same contour as the at least one opening.

6. The aircraft according to claim 5, wherein the first and second zones are juxtaposed.

7. The aircraft according to claim 4, wherein the at least one visual indication system comprises a sliding connection connecting the plate and the cowl, the plate moving in translation in a direction of movement between the first and second positions.

8. The aircraft according to claim 7, wherein the at least one visual indication system comprises a housing connected to the at least one wall of the cowl and configured to allow the plate to slide against the at least one wall in the direction of movement.

9. The aircraft according to claim 8, wherein the housing comprises a bottom parallel to the at least one wall and spaced apart from the latter so as to allow the plate to slide between the at least one wall and the bottom of the housing, and at least two lateral walls, parallel to the direction of movement, connecting the bottom and the at least one wall and configured to form the sliding connection.

10. The aircraft according to claim 9, wherein the at least one opening has first and second transverse edges perpendicular to the direction of movement, and wherein the housing further comprises first and second end walls, perpendicular to the direction of movement, connecting the bottom and the at least one wall, the first and second end walls being separated by a distance equal to or greater than three times the distance separating the first and second transverse edges of the opening.

11. The aircraft according to claim 10, wherein the at least one visual indication system comprises at least one spring, interposed between one of the first and second end walls and the plate, configured to push the plate into the first position and in that the visual indication system comprises a cable, connecting the plate and the locking device, configured to pull the plate into the second position counter to the at least one spring.

* * * * *